(12) United States Patent
Salomonsson et al.

(10) Patent No.: US 10,497,262 B2
(45) Date of Patent: *Dec. 3, 2019

(54) VEHICULAR COLLISION MITIGATION SYSTEM

(71) Applicant: MAGNA ELECTRONICS INC., Auburn Hills, MI (US)

(72) Inventors: Ove J. Salomonsson, Farmington Hills, MI (US); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/817,612

(22) Filed: Nov. 20, 2017

(65) Prior Publication Data

US 2018/0157921 A1  Jun. 7, 2018

Related U.S. Application Data

(63) Continuation of application No. 15/416,217, filed on Jan. 26, 2017, now Pat. No. 9,824,285, which is a
(Continued)

(51) Int. Cl.
*G08G 1/09* (2006.01)
*G08G 1/0967* (2006.01)
(Continued)

(52) U.S. Cl.
CPC ......... *G08G 1/096725* (2013.01); *B60Q 1/08* (2013.01); *B60Q 9/008* (2013.01);
(Continued)

(58) Field of Classification Search
CPC .............................................. G08G 1/096725
See application file for complete search history.

(56) References Cited

U.S. PATENT DOCUMENTS

| 4,720,790 A | 1/1988 | Miki et al. |
| 4,987,357 A | 1/1991 | Masaki |

(Continued)

FOREIGN PATENT DOCUMENTS

WO   WO 2013/081984   6/2013

*Primary Examiner* — Alex C Dunn
(74) *Attorney, Agent, or Firm* — Honigman LLP

(57) ABSTRACT

A collision mitigation system for a vehicle includes a plurality of cameras, a radar sensor and/or lidar sensor, and a control that may process data captured by the cameras, radar sensor and/or lidar sensor. When the vehicle is moving and responsive at least in part to a determination that the vehicle is approaching an object present forwardly of the vehicle, the control is operable to control application by an automatic emergency braking system of a vehicle brake of the vehicle to mitigate collision with the object. Responsive to determination that a following vehicle is following the vehicle and when the determined following vehicle is within a threshold distance from the vehicle and is approaching the vehicle above a threshold rate of approach, the control adjusts automatic emergency braking of the vehicle to mitigate collision at the rear of the vehicle by the determined following vehicle.

28 Claims, 3 Drawing Sheets

Related U.S. Application Data continuation of application No. 15/131,593, filed on Apr. 18, 2016, now Pat. No. 9,563,809, which is a continuation of application No. 14/809,541, filed on Jul. 27, 2015, now Pat. No. 9,318,020, which is a continuation of application No. 14/169,328, filed on Jan. 31, 2014, now Pat. No. 9,092,986.

(60) Provisional application No. 61/886,883, filed on Oct. 4, 2013, provisional application No. 61/834,129, filed on Jun. 12, 2013, provisional application No. 61/760,366, filed on Feb. 4, 2013.

(51) Int. Cl.

| | | |
|---|---|---|
| *G08G 1/16* | (2006.01) | |
| *B60R 1/00* | (2006.01) | |
| *G05D 1/00* | (2006.01) | |
| *G06K 9/00* | (2006.01) | |
| *H04N 7/18* | (2006.01) | |
| *B60Q 1/08* | (2006.01) | |
| *B60Q 9/00* | (2006.01) | |
| *B60T 7/22* | (2006.01) | |
| *F02D 41/04* | (2006.01) | |
| *F02D 41/06* | (2006.01) | |
| *G06K 9/78* | (2006.01) | |

(52) U.S. Cl.
CPC .................. *B60R 1/00* (2013.01); *B60T 7/22* (2013.01); *F02D 41/042* (2013.01); *F02D 41/065* (2013.01); *G05D 1/0088* (2013.01); *G06K 9/00805* (2013.01); *G06K 9/00825* (2013.01); *G06K 9/78* (2013.01); *G08G 1/096766* (2013.01); *G08G 1/166* (2013.01); *G08G 1/167* (2013.01); *H04N 7/181* (2013.01); *B60R 2300/105* (2013.01); *B60R 2300/30* (2013.01); *B60R 2300/80* (2013.01); *B60R 2300/802* (2013.01); *B60R 2300/804* (2013.01); *B60R 2300/8066* (2013.01); *B60R 2300/8093* (2013.01); *G06K 9/00798* (2013.01)

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,151,816 A | 9/1992 | Varaprasad et al. |
| 5,161,107 A * | 11/1992 | Mayeaux ........... G06K 9/00785 340/937 |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |

(56) References Cited

U.S. PATENT DOCUMENTS

| | | |
|---|---|---|
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,023 A | 8/2000 | Schofield et al. |
| 6,097,024 A | 8/2000 | Stam et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,201,642 B1 | 3/2001 | Bos et al. |
| 6,222,447 B1 | 4/2001 | Schofield et al. |
| 6,223,114 B1 | 4/2001 | Boros et al. |
| 6,227,689 B1 | 5/2001 | Miller |
| 6,250,148 B1 | 6/2001 | Lynam |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,516,262 B2 * | 2/2003 | Takenaga ........... B60K 31/0008 340/907 |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,728,623 B2 * | 4/2004 | Takenaga ........... B60K 31/0008 701/93 |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,850,156 B2 | 2/2005 | Bloomfield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |

(56) References Cited

U.S. PATENT DOCUMENTS

| | | |
|---|---|---|
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,370,983 B2 | 5/2008 | De Wind et al. |
| 7,380,948 B2 | 6/2008 | Schofield et al. |
| 7,388,182 B2 | 6/2008 | Schofield et al. |
| 7,398,076 B2 * | 7/2008 | Kubota ............ G08G 1/096725 455/344 |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,446,650 B2 | 11/2008 | Schofield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,676,324 B2 * | 3/2010 | Bae .................. G08G 1/16 340/901 |
| 7,681,960 B2 | 3/2010 | Wanke et al. |
| 7,720,580 B2 | 5/2010 | Higgins-Luthman |
| 7,777,611 B2 | 8/2010 | Desai |
| 7,855,755 B2 | 12/2010 | Weller et al. |
| 7,859,565 B2 | 12/2010 | Schofield et al. |
| 7,881,496 B2 | 2/2011 | Camilleri et al. |
| 7,914,187 B2 | 3/2011 | Higgins-Luthman et al. |
| 7,965,336 B2 | 6/2011 | Bingle et al. |
| 8,013,780 B2 * | 9/2011 | Lynam .................. B60T 7/22 342/70 |
| 8,027,029 B2 | 9/2011 | Lu et al. |
| 8,031,062 B2 * | 10/2011 | Smith .................. G08G 1/166 340/438 |
| 8,058,977 B2 | 11/2011 | Lynam |
| 8,078,379 B2 * | 12/2011 | Lu ...................... B60T 7/18 340/917 |
| 8,340,866 B2 | 12/2012 | Hanzawa et al. |
| 8,606,455 B2 * | 12/2013 | Boehringer ........... B60W 30/17 701/23 |
| 8,694,192 B2 * | 4/2014 | Cullinane .............. G05D 1/00 701/23 |
| 8,694,224 B2 | 4/2014 | Chundrlik, Jr. et al. |
| 8,849,495 B2 | 9/2014 | Chundrlik, Jr. et al. |
| 9,092,986 B2 * | 7/2015 | Salomonsson ......... G08G 1/167 |
| 9,318,020 B2 * | 4/2016 | Salomonsson ......... G08G 1/167 |
| 9,563,809 B2 * | 2/2017 | Salomonsson ......... G08G 1/167 |
| 9,580,013 B2 * | 2/2017 | Wierich ................ G02B 5/10 |
| 9,604,581 B2 * | 3/2017 | Wierich ................ H04N 9/735 |
| 9,824,285 B2 * | 11/2017 | Salomonsson ......... G08G 1/167 |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2006/0290479 A1 | 12/2006 | Akatsuka et al. |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2008/0122597 A1 * | 5/2008 | Englander ................ B60Q 1/24 340/433 |
| 2008/0180529 A1 | 7/2008 | Taylor et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0070172 A1 * | 3/2010 | Kumar .................. B61L 23/041 701/408 |
| 2010/0097469 A1 | 4/2010 | Blank et al. |
| 2010/0228437 A1 | 9/2010 | Hanzawa et al. |
| 2010/0292886 A1 * | 11/2010 | Szczerba ............. G01C 21/365 701/31.4 |
| 2012/0062743 A1 * | 3/2012 | Lynam .................. B60Q 9/005 348/148 |
| 2012/0116632 A1 * | 5/2012 | Bechtel ................ B60Q 1/1423 701/36 |
| 2012/0218412 A1 | 8/2012 | Dellantoni et al. |
| 2012/0245817 A1 | 9/2012 | Cooprider et al. |
| 2012/0262340 A1 | 10/2012 | Hassan et al. |
| 2012/0277947 A1 * | 11/2012 | Boehringer ........... B60W 30/17 701/23 |
| 2012/0303222 A1 | 11/2012 | Cooprider et al. |
| 2012/0312645 A1 * | 12/2012 | Frashure ................ B60T 13/662 188/152 |
| 2013/0116915 A1 * | 5/2013 | Ferreira ................ G08G 1/163 701/117 |
| 2013/0124052 A1 | 5/2013 | Hahne |
| 2013/0131918 A1 | 5/2013 | Hahne |
| 2013/0141582 A1 * | 6/2013 | Reilhac ............... G08G 1/09623 348/148 |
| 2013/0158800 A1 * | 6/2013 | Trageser ............... G08G 1/167 701/41 |
| 2013/0231825 A1 | 9/2013 | Chundrlik, Jr. |

(56) References Cited

U.S. PATENT DOCUMENTS

2014/0067206 A1  3/2014  Pflug
2014/0277901 A1* 9/2014  Ferguson ............ G05D 1/0088
                                                 701/27
2014/0309884 A1  10/2014 Wolf

* cited by examiner

VEHICULAR COLLISION MITIGATION SYSTEM

CROSS REFERENCE TO RELATED APPLICATIONS

The present application is a continuation of U.S. patent application Ser. No. 15/416,217, filed Jan. 26, 2017, now U.S. Pat. No. 9,824,285, which is a continuation of U.S. patent application Ser. No. 15/131,593, filed Apr. 18, 2016, now U.S. Pat. No. 9,563,809, which is a continuation of U.S. patent application Ser. No. 14/809,541, filed Jul. 27, 2015, now U.S. Pat. No. 9,318,020, which is a continuation of U.S. patent application Ser. No. 14/169,328, filed Jan. 31, 2014, now U.S. Pat. No. 9,092,986, which claims the filing benefits of U.S. provisional applications, Ser. No. 61/886,883, filed Oct. 4, 2013; Ser. No. 61/834,129, filed Jun. 12, 2013, and Ser. No. 61/760,366, filed Feb. 4, 2013, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that may be displayed or processed to provide the desired display images and/or processing and control, depending on the particular application of the camera and vision or imaging system.

According to an aspect of the present invention, a vision system or alert system is operable, based on image processing of image data captured by a forward facing camera of the vehicle, to determine when the vehicle is stopped at a traffic light and another vehicle is ahead of the equipped vehicle at the traffic light, and is further operable to determine when the traffic light changes to green and the vehicle in front of the equipped or subject vehicle begins to move forward away from the equipped vehicle. At least in part responsive to such detection or determination, the system is operable to generate an alert or notification to the driver of the equipped vehicle and/or the system may govern or control forward movement of the equipped vehicle. The system thus alerts the driver of the possibility or likelihood that a traffic light has changed to green or the like, whereby the driver may, if appropriate, proceed forward to follow the leading vehicle into or through the intersection or the like.

According to another aspect of the present invention, an automatic braking system for a vehicle comprises a forward viewing camera and a rearward viewing camera disposed at a vehicle and an image processor operable to process image data captured by the forward viewing camera and the rearward viewing camera. Responsive at least in part to a determination that the equipped vehicle is approaching an object (such as a leading vehicle or other object) present forwardly of the equipped vehicle (such as in the lane being traveled by the equipped vehicle and/or in the forward path of travel of the equipped vehicle), the automatic braking system is operable to apply a vehicle brake of the equipped vehicle to mitigate or reduce the likelihood of collision with the determined object. Responsive at least in part to a determination that another vehicle is following the equipped vehicle (such as in the lane being traveled by the equipped vehicle and/or otherwise trailing or following the equipped vehicle) and the determined following vehicle is at least one of (i) within a threshold distance from the equipped vehicle and (ii) approaching the equipped vehicle at a threshold rate, the automatic braking system adjusts or reduces application of the vehicle brakes to mitigate or reduce the likelihood of a rear collision by the determined following vehicle. For example, the system may reduce the degree of braking responsive to a determination that a following vehicle is too close or within a threshold distance and/or is approaching too fast or above a threshold rate of approach, in order to mitigate the potential rear collision with the following vehicle upon application of the brakes to mitigate or avoid a front collision with the leading vehicle.

These and other objects, advantages, purposes and features of the present invention will become apparent upon review of the following specification in conjunction with the drawings.

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

Figure 1:
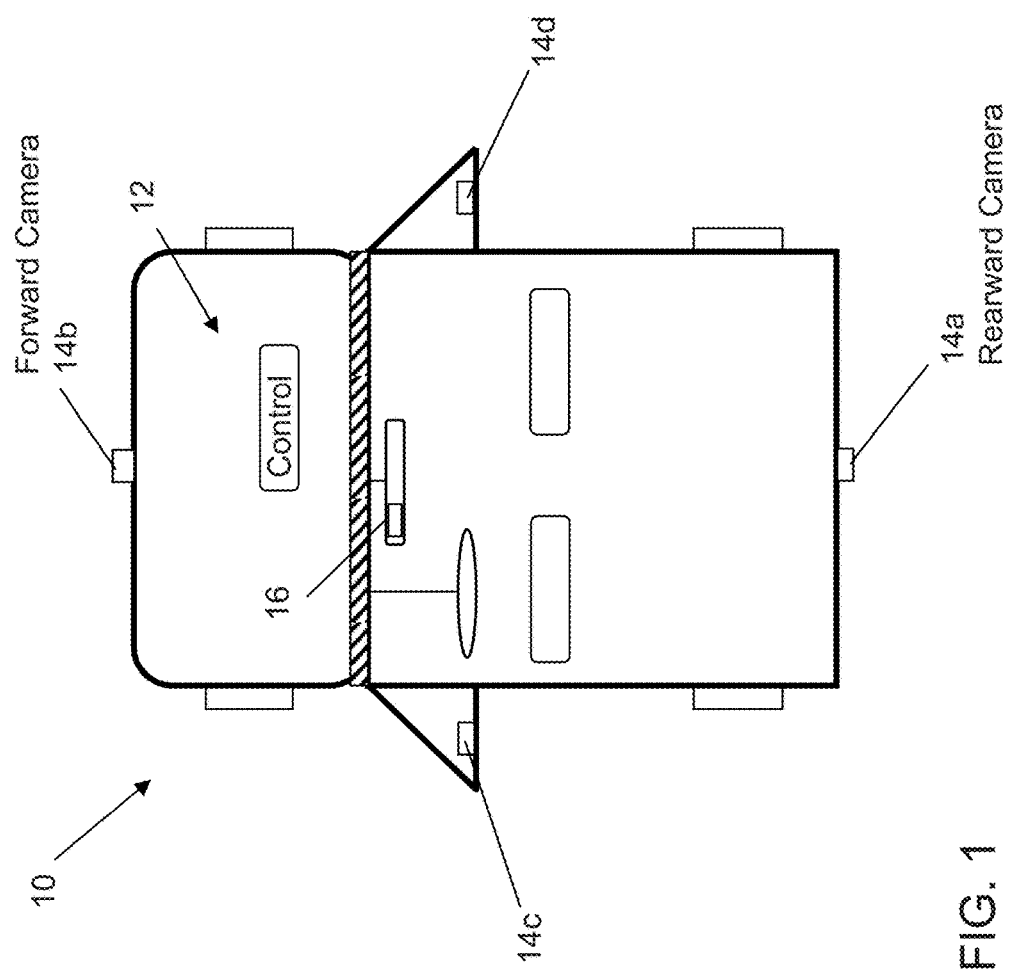
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14d at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

When a driver of a vehicle is at a traffic light that is red and waiting at red light for green, the driver may not pay attention to the traffic light status, and may concentrate on other items or the like. For example, the driver of the stopped vehicle may check text messages or emails or the like while waiting for the traffic light to change to green. When not paying attention to the traffic light or traffic or vehicle ahead of the driver's vehicle, the driver may not notice when the traffic light turns to green and when the vehicle or vehicles ahead of the driver have proceeded into the intersection or the like. Often, drivers that are slow to start moving when a traffic signal changes to a green light are slow to respond due to inattention, or rather misguided attention to emails or texts or the like, instead of the traffic light (green light) and/or traffic ahead of the equipped vehicle, and thus do not notice that the vehicle in front of them just moved forward and away from the equipped vehicle.

The present invention provides a feature or alert system which, based on the vehicle's forward viewing camera or forward camera module, and using the camera's or vision system's vehicle detection algorithms, detects that the vehicle in front of the equipped vehicle is starting to move forward and, responsive to such detection, alerts the driver of the equipped vehicle to look up and, if appropriate, to also start driving the vehicle forward. The system is operable to determine when the equipped vehicle is at a traffic light and when the traffic light is a red light or a green light and when another vehicle is ahead of the equipped vehicle. Thus, when the system determines that the equipped vehicle is at a red light and stopped behind another vehicle at the red light, and then determines that the light changes to green and the leading other vehicle moves away and into the intersection, the system may generate an alert or control signal, such as after the leading vehicle moves a threshold distance ahead of the equipped vehicle with the equipped vehicle still not moving. The threshold value for the distance between the leaving leading vehicle and the equipped vehicle at which the alert is generated may be any suitable distance, such as, for example, at least about two meters or at least about three meters or more, in order to make sure that the alert is a valid notification.

The present invention thus provides a new function for a front camera 114b of a vehicle vision system of a vehicle 110 (see FIG. 2) with vehicle detection algorithm and driver notification output (such as a visual alert output, a tactile alert output and/or an audio alert output, such as, for example, speech from an audio system of the vehicle, or the like). The alert system of the present invention thus may use the front camera and the vehicle detection algorithms and connections to the vehicle's human machine interfaces (HMIs), which may already be existing in the vehicle vision system, such as for a surround view or bird's eye view vision system or the like, to notify the driver of the equipped vehicle to start moving after the target or leading vehicle 120 has moved forward and away from the equipped vehicle a threshold distance. The system of the present invention thus uses the camera or cameras already present on the vehicle. For example, the camera or cameras used by the alert system may be part of a multi-camera vision system or surround view system or forward facing camera system of the vehicle (and may utilize aspects of the systems described in U.S. Pat. No. 7,855,755, which is hereby incorporated herein by reference in its entirety). Such use of cameras already present on the vehicle for other purposes reduces the cost of the recording system, since no dedicated cameras are needed for the alert system when the alert system is added to the vehicle.

Preferably, the alert system will operate in a manner that will not annoy the driver with warnings if the driver is already aware of what is going on ahead of the equipped vehicle. For example, in addition to the detection of the movement of the vehicle in front of the equipped vehicle, the alert system of the present invention may not provide an alert when the driver of the equipped vehicle takes actions to initiate movement of the equipped vehicle, such as applying the accelerator or turning the steering wheel or engaging or disengaging the clutch or any other suitable actions or parameters that indicate that the driver is alert and is driving the vehicle or is about to drive the vehicle.

Thus, the alert system of the present invention provides reliable detection of the target or leading vehicle speed and/or the distance between the target or leading vehicle and the equipped vehicle in order to avoid warning or alerting the driver of the equipped vehicle every time the target vehicle advances slightly to adjust within a line of vehicles at a traffic light or intersection or the like. The notification or alert to the driver of the equipped vehicle also should be provided early enough to be useful to the driver. For example, the threshold setting may be set low enough to provide an alert when it is highly likely that the driver is inattentive but high enough to avoid false alerts. Optionally, the threshold setting may be adjustable or adaptive for different drivers.

Optionally, with the increased proliferation of start-stop technology, it is envisioned that the present invention may be operable to start the engine of the equipped vehicle even before the driver presses the gas pedal based on the intersection alert (such as when the system determines that the light changes to green and/or when the system determines that the leading vehicle starts to move away from the stopped equipped vehicle) to save time in moving the vehicle forward. The starting of the engine would also provide an alert or indication to the driver that he or she should pay attention to the traffic and/or traffic light ahead of the equipped vehicle.

Optionally, the alert system of the present invention may be responsive to detection of other items or events in addition to or instead of detection of the forward movement of the vehicle ahead of the equipped vehicle. For example, the system may process image data captured by the forward viewing camera to detect when the traffic or intersection light changes from red to green, whereby the system may generate the alert when forward movement of the leading vehicle is detected and when the system detects that the traffic light is green. Such an additional sensing may be implemented when the traffic light is in clear view/sight of the camera, and thus such an additional sensing may comprise a complementary or auxiliary sensing, but not the main sensing parameter or input for the system. Such a sensing of the state of the traffic light may allow the alert system to operate in situations where the equipped vehicle is at an intersection with no vehicles ahead of the equipped vehicle, whereby an alert may be generated responsive to a detection of the traffic light changing to green and no indication that the drier of the equipped vehicle is aware of the change.

Optionally, the alert system may only operate to detect the movement of the leading vehicle and alert the driver of the equipped vehicle accordingly, if the system first detects or determines that the equipped vehicle is at a traffic light intersection, or optionally if the system detects or determines that the equipped vehicle is in a line of at least two vehicles at a stop sign or the like. Optionally, the alert system may be operable to determine movement of the leading vehicle and to generate the alert in response to first determining, such as via a GPS system of the vehicle or the like, that the equipped vehicle is stopped at or near an intersection.

Optionally, by using vehicle-to-roadside bidirectional communication or roadside-to-vehicle communication from the intersection light or signal to the camera, the alert system may receive a signal or communication that is indicative of when the traffic light switches to green (such as by utilizing aspects of V2V communications or X2V communications or the like). Such a communication may also augment or supplement the sensing of forward movement of a leading vehicle.

Optionally, the alert system may link the knowledge of the distance to the target or leading vehicle (when the leading vehicle is stationary or still or when starting to move forward) to an overall vehicle safety system, whereby the system may use such information during a rear end collision at the rear of the equipped vehicle in order to mitigate the impact or collision.

Optionally, the alert system may be operable to provide a start notification using an in-vehicle telematics system or communication protocol, such as an in-vehicle BLU-ETOOTH® system or the like. For example, responsive to detection of the leading vehicle moving forward (indicative of, for example, the traffic light changing to a green light), an alert or notification or output from the vehicle alert system may be communicated to the driver's PDA or cell phone or smartphone or communication device or the like as a means for the start notification. Such an alert may be useful since the driver, who is not moving the vehicle forward with the vehicle ahead of the equipped vehicle, may already be looking at his or her PDA or cell phone or smartphone display or the like, and even if not looking at the PDA or cell phone or smartphone or the like, will not be annoyed by any audible (such as a chime or voice message) notification or visual notification from the vehicle. For example, the driver's PDA or cell phone or smartphone or communication device may display "get moving" or any similar text or message or icon or the like (and such a visual message may be coupled with any audible alert or chime if the user so chooses). The alert may be selectable by the driver so that the alert that is provided is acceptable to and preferred by the driver of the equipped vehicle.

Optionally, such an alert may only be generated by the cell phone or smartphone or PDA or communication device or the like only when the cell phone or smartphone or PDA or communication device is in a certain type of application that likely has the driver's attention at that time (such as, for example, when the driver's phone is in an email mode or text messaging mode or internet browsing mode or any active mode or app or game that would typically require the user's attention), and the system may limit such notification frequency even further to keep annoyance to a reduced level or minimum level. The alert system may communicate with the driver's communication device and may receive a signal or output therefrom that is indicative of the current state of the device, such as what app or function the device is currently operating, and the alert system may, responsive at least in part to such a determination, communicate an alert to the communication device to alert the driver of the change in traffic light or movement of the vehicle or vehicles ahead of the equipped vehicle.

Optionally, and alternatively (or complementary) to any of the above notifications or alerts, the start notification may comprise an alert or change at the radio/NAV display or the like. Such an alert may be provided in cases where the driver is entering GPS data or adjusting the controls or the like of the radio and/or navigation and/or telematics system of the vehicle (or any other system or accessory of the vehicle that utilizes user inputs). For example, a big red symbol (or green symbol) on the NAV screen would be an attention grabber to alert the driver that it may be time to drive the equipped vehicle forward.

Thus, the present invention provides an alert system that is operable to determine when a vehicle ahead of the equipped vehicle moves forward from a stopped position, such as when a traffic light changes to green, and may determine that the leading vehicle moves a threshold distance ahead of the equipped vehicle and/or the equipped vehicle does not follow within a threshold time period or the like, and, responsive to such determination or determinations, alerts the driver to pay attention and, if appropriate, drive the equipped vehicle forward and into and/or through the intersection. The alert system may only generate the alert responsive to other detections or determinations or parameters, such as a detection that the driver is using a vehicle accessory or system or using a cell phone or PDA or communication device or the like, and thus is not likely paying attention to the current driving situation. Optionally, the alert system may only generate the alert if the detection of movement of the leading vehicle occurs after the equipped vehicle has stopped behind the leading vehicle or when the system determines that the equipped vehicle is at an intersection or the like.

Thus, the present invention may provide an alert system that utilizes a standard or existing front camera of a vehicle with existing forward field of view and vehicle detection algorithms. The present invention, by alerting the driver when it is time to commence or recommence driving, provides an incentive for or allows drivers to read incoming texts or emails or the like when the vehicle is stopped at an intersection, without concerns with sitting through a green light or holding up following traffic or the like. Such an alert system thus may encourage drivers to not text or check emails or the like while moving/driving the vehicle along the road, since they will be able to focus on the texts and emails at the next stop light, without worrying about not paying attention to the traffic light or vehicles ahead of the equipped vehicle. The present invention may also increase the efficiency of traffic flow at intersections by limiting or reducing the time that a vehicle may sit after the vehicle in front of it has moved forward. Such increased efficiency may also reduce irritation and possible road rage between drivers, and may reduce the number of rear end collisions at intersections based on less uncertainty and hesitating driver and better flow in the line of vehicles at intersection. The present invention also increases the benefits from front cameras for little or close to no cost to drive the acceptance and implementation of such forward viewing or front cameras in the market place.

The alert system utilizes a forward viewing camera that may be disposed at a forward region of the vehicle and/or at or behind the windshield of the vehicle, such as at a windshield electronics module or forward camera module or interior rearview mirror assembly or the like. The camera may comprise any suitable camera or imaging sensor, such as discussed below. The system includes an image processor for processing image data captured by the forward facing camera to determine that (i) the equipped vehicle is stopped at a red traffic light, (ii) another vehicle is ahead of the equipped vehicle at the traffic light, (iii) the traffic light changes to a green light, (iv) the leading vehicle moves away from the equipped vehicle and (v) the equipped vehicle does not move. When the equipped vehicle does not move for a threshold period of time after the leading vehicle moves (or after the traffic light changes to a green light) or when the leading vehicle moves a threshold distance away from the non-moving equipped vehicle, the system may generate an alert or control a vehicle system (such as the ignition to start a shut off vehicle or such as a display system to display a message or such as a control system that provides a haptic signal, such as by vibrating the steering wheel, or the like) to alert the driver that it is time to drive the vehicle forward into the intersection.

Optionally, the system of the present invention may utilize a rear video camera with vehicle detection output to a front camera of the vehicle. For example, the system of the present invention may avoid rear end collisions (by a vehicle rearward of and following the equipped lead vehicle) by deliberately activating the rear brake lights of the equipped vehicle earlier when a Forward Collision Alert (FCA) system tracks close to the time to collision (TTC) for activation of the braking system of the lead (Ego) vehicle function (such as low speed collision mitigation by braking (LSCMB)/pedestrian collision mitigation by braking (PedCMB) or the like). This may provide a useful function even without automatic braking as a warning to drivers close behind an FCA equipped vehicle. The system basically provides a heads up or alert to the driver of a following vehicle or vehicles that the driver of the leading vehicle ahead of the following vehicle(s) may brake soon.

Optionally, the system may delay/minimize CMB braking force of the lead equipped (Ego) vehicle when TTC is reached if a vehicle is following close behind the lead vehicle, in order to limit or mitigate or avoid rear end collision. This may be seen as conflicting objectives with braking for the obstacle ahead of the equipped vehicle, but if the distance is known to a detected object or obstacle in front of the equipped vehicle and the distance to the following vehicle is known, there will be an optimal compromise available to enhance limiting or mitigation of or avoidance of collision with one or both objects/vehicles. This could also limit liabilities or required safety levels (including Automotive Safety Integrity Levels or ASILs) and may reduce or eliminate the need for a "perfect" front camera system that operates without false positives.

Figure 3:
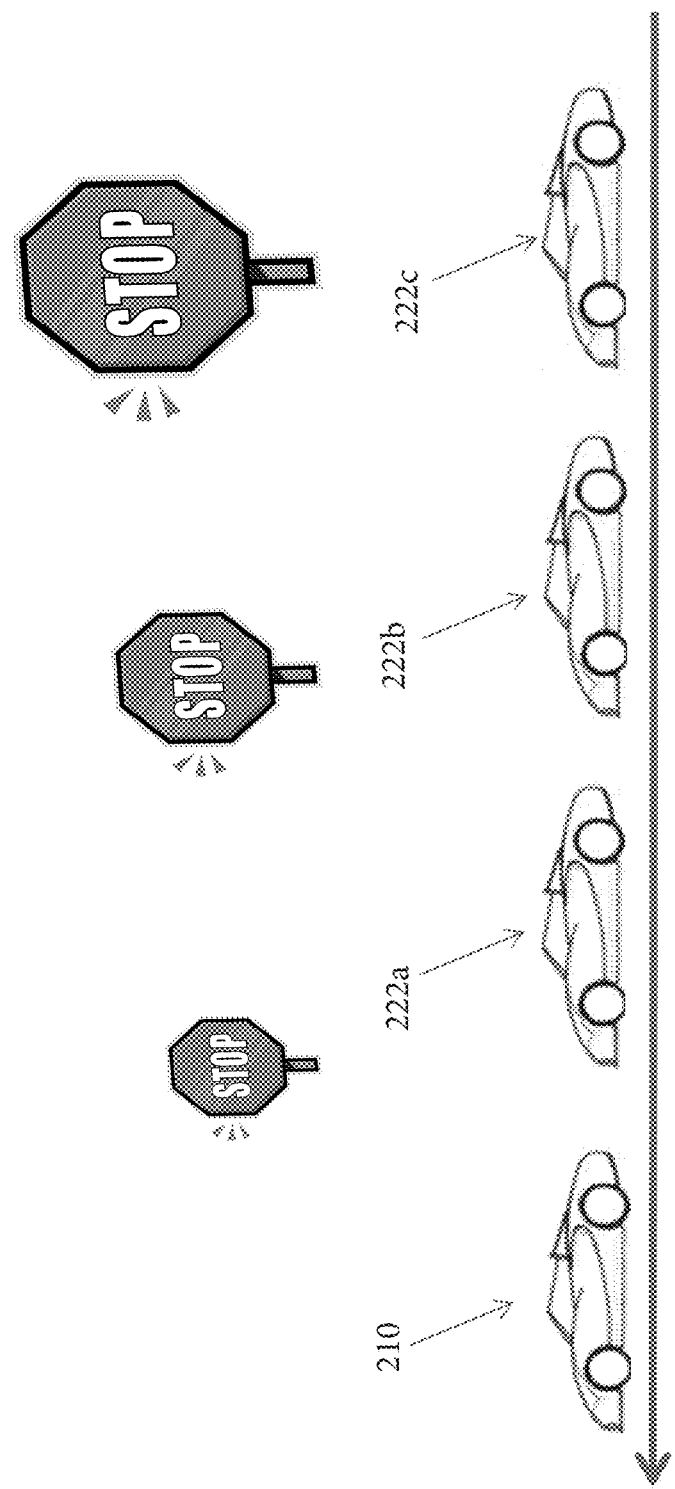
FIG. 3 is a schematic showing the braking strategy for a vehicle with an automatic emergency braking system of the present invention.

For example, and with reference to FIG. 3, a vehicle 210 equipped with an automatic emergency braking (AEB) system includes a forward facing camera that captures images forward of the vehicle, whereby the AEB system is operable to apply the vehicle brakes responsive to detection of a vehicle or obstacle ahead of the vehicle and in the field of view of the forward facing camera. The application of the braking system and degree of braking applied by the AEB system is determined by an assessment of the situation ahead of the vehicle. For example, a high degree of braking may be applied if the equipped vehicle is rapidly approaching a detected obstacle or object or vehicle and/or is within a threshold distance to the detected object, while a lower degree of braking may be applied if the equipped vehicle is approaching a detected obstacle or object or vehicle at a slower rate and/or is at a greater threshold distance to the detected object. The AEB system may consider the speed of the subject or equipped vehicle and speed of the detected object (or relative speed or rate of approach between the two vehicles) and the distance between the equipped vehicle and the detected object in determining the rate of braking of the equipped vehicle.

Optionally, the AEB system may be responsive to an output of a rear camera of the vehicle, and may adjust the braking responsive to a determination that another vehicle is following the equipped vehicle. For example, the system may provide a decreasing level of braking if a vehicle is determined to be closely behind the equipped vehicle and may only initiate a maximum braking or high braking if there is no vehicle detected behind the equipped vehicle or if there is a vehicle detected behind the equipped vehicle but a rear end collision is unavoidable and the maximum braking is needed to avoid or reduce or mitigate a collision with a detected object or vehicle ahead of the equipped vehicle.

Figure 2:
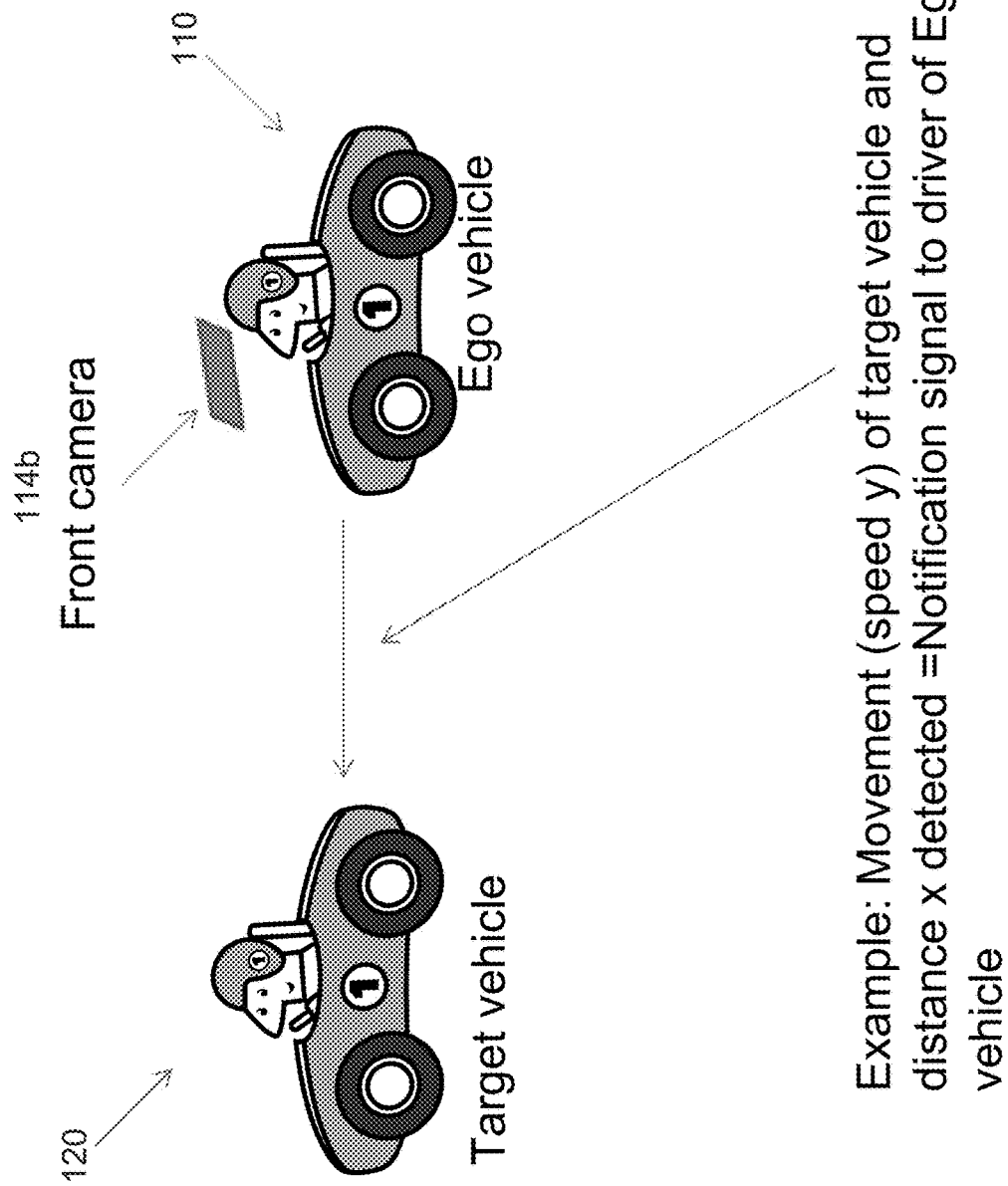
FIG. 2 is side view of a target vehicle ahead of a vehicle equipped with the vision system and alert system of the present invention.

As shown in FIG. 3, the equipped vehicle 210 may adjust the degree of braking responsive to a determined distance (and optionally a determined rate of approach) of a following vehicle (222a, 222b, 222c) behind the equipped vehicle. The determination of whether or not braking is needed may be made responsive to the front camera assessment (such as via image processing of image data captured by the forward viewing camera and determination of a leading vehicle ahead of the equipped vehicle that is approaching the equipped vehicle), and the determined degree of braking may initially be set based on the front camera assessment, whereby that determined degree of braking may be adjusted or reduced based on a determination of the presence and distance and approach of a following vehicle behind the equipped vehicle. For example, and as can be seen in FIG. 2, if a trailing vehicle 222a is following closely behind the equipped vehicle 210 (within a threshold distance), the degree of braking (as determined responsive to the forward facing camera) may be reduced to avoid or mitigate a rear end collision, while if a trailing vehicle 222b is following at a greater distance behind the equipped vehicle (greater than the threshold distance), the degree of braking (as determined responsive to the forward facing camera) may be reduced a lesser amount, and if a trailing vehicle 222c is following at an even greater distance (greater than a larger threshold distance), the AEB system may provide maximum braking or may not reduce the determined rate of braking as determined based on image processing of image data captured by the forward facing camera. The degree of braking that is applied is thus adjusted based on the distance (and rate of approach) to the detected trailing vehicle that is following behind the equipped vehicle (such as in the lane of traffic of the equipped vehicle).

Thus, the automatic braking system for a vehicle includes an image processor operable to process image data captured by front and rear cameras of the equipped vehicle. Responsive at least in part to a determination that the equipped vehicle is approaching an object determined to be present forwardly of the equipped vehicle, the system is operable to apply the vehicle brakes to reduce the likelihood of collision with the determined object. Also, responsive at least in part to a determination that another vehicle is following the equipped vehicle and within at least one of (i) a threshold distance from the equipped vehicle and (ii) a threshold rate of approach to the equipped vehicle, the system is operable to adjust the application of the vehicle brakes to reduce the likelihood of a rear collision by the determined following vehicle.

The braking system may be operable to determine a degree of application of the vehicle brakes to mitigate collision with the determined forward object and the determined following vehicle. The braking system may be operable to apply a maximum degree of braking only when the system determines that there is no vehicle following the equipped vehicle within a threshold distance from the equipped vehicle. Optionally, the braking system may be operable to apply a maximum or high degree of braking even when the system determines that there is a vehicle following the equipped vehicle but also determines that the rate of approach to the leading vehicle requires a high degree of braking to mitigate an imminent collision. The system may consider the rate of approach and distance to the leading vehicle and compare that to the rate of approach and distance to the trailing vehicle in determining the best degree of braking of the subject vehicle to mitigate either or both potential or imminent collisions.

Thus, an AEB system is provided that uses input from a rearward facing camera and adjusts the braking level accordingly. Such a system allows for a lower ASIL for a front camera system. If the system detects that there is no vehicle within some distance behind the AEB vehicle, then the system can brake at a high level (such as, for example, up to about 1 g or thereabouts) without consequences (such as rear end collision) even for situations when the AEB system is triggered by a false positive. In other words, by only max-braking when there is no vehicle following the equipped vehicle, the risk of harming someone is reduced (which may translate to a lower required ASIL). In the fairly low occurrence case that someone is really close behind the equipped vehicle, the system may limit or reduce the applied braking responsive to a rear camera data input. Thus, such a system utilizes vehicle or object detection capability in the rear camera or multi-camera system of the vehicle.

Another positive or benefit of the reduced risk for causing inadvertent rear end collisions (such as when the AEB system, responsive to a front camera output, issues the brake command without regard to what is following behind the equipped vehicle), is that the TTC (Time To Collision) brake trigger settings in the front camera could, optionally, be extended to allow for more false positives, while also insuring that no proper (true positive) braking for a vehicle/pedestrian is ever missed.

Optionally, the system of the present invention may include or utilize additional lane departure warning (LDW) support data from lane markings detected behind the vehicle. Thus, the rear camera may augment the lane marking detection by the forward facing camera and associated processor. The image data captured by the rear facing camera may be processed by the same image processor as the front camera image data or a separate image processor may be used to process image data captured by the rearward facing imager or camera.

The system of the present invention thus uses the camera or cameras already present on the vehicle. For example, the camera or cameras used by the alert and/or braking system may be part of a multi-camera vision system or surround view system or rear backup aid system or forward facing camera system of the vehicle (and may utilize aspects of the systems described in U.S. Pat. No. 7,855,755, which is hereby incorporated herein by reference in its entirety). Such use of cameras already present on the vehicle for other purposes reduces the cost of the recording system, since no dedicated cameras are needed for the recording system when the recording system is added to the vehicle.

Optionally, the vision and/or alert system may utilize other types of forward facing or forward viewing sensors, such as a radar sensor or lidar sensor or the like, either instead of a camera or in conjunction with a camera. Optionally, the alert system may utilize a ladar sensor (a radar type sensor that uses lasers instead of radio frequencies), such as a ladar sensor that comprises a two dimensional (2D) optical phased array. The ladar sensor, instead of using radio waves, uses lasers to scan a given area, and emits optical beams and returns information that is more detailed than radar. A 2D laser phased array developed by Defense Advanced Research Projects Agency (DARPA) of Va. is around the size of the head of a pin (about 576 μm×576 μm) and all of the required circuitry and/or components, such as 4,096 nanoantennas arranged in a 64×64 fashion, may be incorporated onto a single silicon chip. The ladar chip may provide dynamic beam steering via an 8×8 array.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066570, filed Nov. 27, 2012 and published as International Publication No. WO 2013/081984, and/or PCT Application No. PCT/US2012/066571, filed Nov. 27, 2012 and published as International Publication No. WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent application Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013; Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/893,489, filed Oct. 21, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/766,883, filed Feb. 20, 2013; Ser. No. 61/760,364, filed Feb. 4, 2013; Ser. No. 61/756,832, filed Jan. 25, 2013; and/or Ser. No. 61/754,804, filed Jan. 21, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011 and published as U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. patent application Ser. No. 12/508,840, filed Jul. 24, 2009, and published Jan. 28, 2010 as U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published as U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011 and published as U.S. Publication No. US-2012-0162427, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular collision mitigation system, said vehicular collision mitigation system comprising:
   a plurality of cameras disposed at a vehicle equipped with said vehicular collision mitigation system, wherein said cameras have respective fields of view exterior of the equipped vehicle;
   wherein at least one of said cameras comprises a forward viewing camera disposed at a front portion of the equipped vehicle so as to view at least forward of the equipped vehicle;
   wherein said forward viewing camera comprises a photosensor array having rows and columns of photosensor elements and comprising at least 1 million photosensor elements;
   wherein at least one of said cameras comprises a rearward viewing camera disposed at a rear portion of the equipped vehicle so as to view at least rearward of the equipped vehicle;
   wherein said rearward viewing camera comprises a photosensor array having rows and columns of photosensor elements and comprising at least 1 million photosensor elements;
   at least one selected from the group consisting of (i) a radar sensor disposed at the equipped vehicle so as to sense at least forward of the equipped vehicle and (ii) a lidar sensor disposed at the equipped vehicle so as to sense at least forward of the equipped vehicle;
   a control disposed at the equipped vehicle, said control comprising an image processor operable to process image data captured by said plurality of cameras disposed at the equipped vehicle;
   said control operable to process at least one selected from the group consisting of (i) radar data captured by said radar sensor disposed at the equipped vehicle and (ii) lidar data captured by said lidar sensor disposed at the equipped vehicle;
   wherein, responsive at least in part to processing at said control of image data captured by said forward viewing camera and to processing at said control of at least one selected from the group consisting of (i) radar data captured by said radar sensor disposed at the equipped vehicle and (ii) lidar data captured by said lidar sensor disposed at the equipped vehicle, an automatic emergency braking system of the equipped vehicle is controlled;
   wherein, when the equipped vehicle is moving and responsive at least in part to a determination, via at least one selected from the group consisting of (i) image processing by said image processor of image data captured by said forward viewing camera and (ii) processing at said control of at least one selected from the group consisting of captured radar data and captured lidar data, that the equipped vehicle is approaching an object present forwardly of the equipped vehicle, said control controls application by said automatic emergency braking system of a vehicle brake of the equipped vehicle to mitigate collision with the object; and
   wherein, responsive to determination, at least in part via image processing by said image processor of image data captured by said rearward viewing camera, that a following vehicle is following the equipped vehicle and when the determined following vehicle is within a threshold distance from the equipped vehicle and is approaching the equipped vehicle above a threshold rate of approach, said control adjusts automatic emergency braking of the equipped vehicle to mitigate collision at the rear of the equipped vehicle by the determined following vehicle.

2. The vehicular collision mitigation system of claim 1, wherein, when the equipped vehicle is moving and responsive at least in part to determination that the moving equipped vehicle is approaching the object determined present forwardly of the equipped vehicle and when the determined following vehicle is beyond a threshold distance from the equipped vehicle and is approaching the equipped vehicle below a threshold rate of approach, said control controls application of the vehicle brake by said automatic emergency braking system of the equipped vehicle at a first degree of braking.

3. The vehicular collision mitigation system of claim 2, wherein, when the equipped vehicle is moving and responsive at least in part to determination that the moving equipped vehicle is approaching the object determined present forwardly of the equipped vehicle and responsive at least in part to determination of the determined following vehicle being within a threshold distance from the equipped vehicle and approaching the equipped vehicle above a threshold rate of approach, said control controls application of the vehicle brake by said automatic emergency braking system of the equipped vehicle at a second degree of braking.

4. The vehicular collision mitigation system of claim 3, wherein the second degree of braking is less than the first degree of braking.

5. The vehicular collision mitigation system of claim 4, wherein said control determines the second degree of braking based on at least one selected from the group consisting of (i) distance of the determined following vehicle from the equipped vehicle and (ii) rate of approach of the determined following vehicle to the equipped vehicle.

6. The vehicular collision mitigation system of claim 1, wherein, in order to mitigate collision by the equipped vehicle with the object determined present forwardly of the equipped vehicle and in order to mitigate collision by the determined following vehicle with the equipped vehicle, said control determines a degree of braking of the equipped vehicle responsive to a comparison of (i) rate of approach and distance of the equipped vehicle to the object determined present forwardly of the equipped vehicle and (ii) rate of approach and distance of the determined following vehicle to the equipped vehicle.

7. The vehicular collision mitigation system of claim 1, wherein, responsive to determination that the moving equipped vehicle is approaching the object determined to be present forwardly of the equipped vehicle and responsive to rate of approach and distance of the equipped vehicle to the object determined present forwardly of the equipped vehicle, said vehicular collision mitigation system generates an alert to a driver of the equipped vehicle.

8. The vehicular collision mitigation system of claim 1, wherein, responsive to determination that the following vehicle is following the equipped vehicle and responsive to rate of approach and distance of the determined following vehicle to the equipped vehicle, said vehicular collision mitigation system generates an alert to a driver of the equipped vehicle.

9. The vehicular collision mitigation system of claim 1, wherein, when the equipped vehicle is moving and said automatic emergency braking system of the equipped vehicle is braking the equipped vehicle, and responsive at least in part to determination that the determined following vehicle is within a threshold distance from the equipped vehicle and is approaching the equipped vehicle above a threshold rate of approach, said control reduces application of the vehicle brake to mitigate a rear collision by the determined following vehicle with the equipped vehicle.

10. The vehicular collision mitigation system of claim 1, wherein, when the equipped vehicle is moving and said automatic emergency braking system of the equipped vehicle is braking the equipped vehicle, said control determines a degree of application of the vehicle brake to mitigate collision by the equipped vehicle with the object determined present forwardly of the equipped vehicle and to mitigate collision by the determined following vehicle with the equipped vehicle.

11. The vehicular collision mitigation system of claim 1, wherein, when the equipped vehicle is moving and responsive at least in part to determination that the moving equipped vehicle is approaching the object determined present forwardly of the equipped vehicle, said automatic emergency braking system of the equipped vehicle is operable to apply maximum braking of the equipped vehicle when there is no vehicle determined to be following the equipped vehicle within a threshold distance from the equipped vehicle.

12. The vehicular collision mitigation system of claim 1, wherein said forward viewing camera is disposed behind a windshield of the equipped vehicle so as to view at least forwardly of the equipped vehicle through the windshield, and wherein said image processor processes image data captured by said forward viewing camera for at least one selected from the group consisting of (i) a headlamp control system of the equipped vehicle and (ii) a lane departure warning system of the equipped vehicle.

13. The vehicular collision mitigation system of claim 1, wherein said image processor processes image data captured by said rearward viewing camera for at least one selected from the group consisting of (i) a rear backup system of the equipped vehicle and (ii) a surround view system of the equipped vehicle.

14. The vehicular collision mitigation system of claim 1, wherein, responsive to a vehicle system of the equipped vehicle, said control determines when the equipped vehicle is stopped, and wherein said vehicle system comprises one selected from the group consisting of (i) a speed sensor of the equipped vehicle and (ii) a braking system of the equipped vehicle.

15. The vehicular collision mitigation system of claim 14, wherein the object present forwardly of the equipped vehicle comprises a vehicle.

16. A vehicular collision mitigation system, said vehicular collision mitigation system comprising:

a plurality of cameras disposed at a vehicle equipped with said vehicular collision mitigation system, wherein said cameras have respective fields of view exterior of the equipped vehicle;

wherein at least one of said cameras comprises a forward viewing camera disposed behind a windshield of the equipped vehicle so as to view at least forwardly of the equipped vehicle through the windshield;

wherein said forward viewing camera comprises a photosensor array having rows and columns of photosensor elements and comprising at least 1 million photosensor elements;

wherein at least one of said cameras comprises a rearward viewing camera disposed at a rear portion of the equipped vehicle so as to view at least rearward of the equipped vehicle;

wherein said rearward viewing camera comprises a photosensor array having rows and columns of photosensor elements and comprising at least 1 million photosensor elements;

at least one radar sensor disposed at the equipped vehicle so as to sense at least forward of the equipped vehicle;

a control disposed at the equipped vehicle, said control comprising an image processor operable to process image data captured by said plurality of cameras;

said control operable to process radar data captured by said at least one radar sensor;

wherein, responsive at least in part to processing at said control of image data captured by said forward viewing camera and to processing at said control of radar data captured by said at least one radar sensor, an automatic emergency braking system of the equipped vehicle is controlled;

wherein, when the equipped vehicle is moving and responsive at least in part to a determination, via at least one selected from the group consisting of (i) image processing by said image processor of image data captured by said forward viewing camera and (ii) processing at said control of radar data captured by said at least one radar sensor, that the equipped vehicle is approaching an object present forwardly of the equipped vehicle, said control is operable to control application by said automatic emergency braking system of a vehicle brake of the equipped vehicle to mitigate collision with the object;

wherein, responsive to determination, at least in part via image processing by said image processor of image data captured by said rearward viewing camera, that a following vehicle is following the equipped vehicle and when the determined following vehicle is within a threshold distance from the equipped vehicle and is approaching the equipped vehicle above a threshold rate of approach, said control adjusts automatic emergency braking of the equipped vehicle to mitigate collision at the rear of the equipped vehicle by the determined following vehicle;

wherein, when the equipped vehicle is moving and responsive at least in part to determination that the moving equipped vehicle is approaching the object determined present forwardly of the equipped vehicle and when the determined following vehicle is beyond a threshold distance from the equipped vehicle and is approaching the equipped vehicle below a threshold rate of approach, said control controls application of the vehicle brake by said automatic emergency braking system of the equipped vehicle at a first degree of braking;

wherein, when the equipped vehicle is moving and responsive at least in part to determination that the moving equipped vehicle is approaching the object determined present forwardly of the equipped vehicle and responsive at least in part to determination of the determined following vehicle being within a threshold distance from the equipped vehicle and approaching the equipped vehicle above a threshold rate of approach, said control controls application of the vehicle brake by said automatic emergency braking system of the equipped vehicle at a second degree of braking;

wherein the second degree of braking is less than the first degree of braking; and wherein said control determines the second degree of braking based at least on distance of the determined following vehicle from the equipped vehicle and rate of approach of the determined following vehicle to the equipped vehicle.

17. The vehicular collision mitigation system of claim 16, wherein said image processor processes image data captured by said rearward viewing camera for a rear backup system of the equipped vehicle.

18. The vehicular collision mitigation system of claim 17, wherein said image processor processes image data captured by said forward viewing camera for a headlamp control system of the equipped vehicle.

19. The vehicular collision mitigation system of claim 17, wherein at least one lidar sensor is disposed at the equipped vehicle so as to sense at least forward of the equipped vehicle, and wherein said control is operable to process lidar data captured by said at least one lidar sensor, and wherein responsive at least in part to processing at said control of image data captured by said forward viewing camera and to processing at said control of at least one selected from the group consisting of (i) radar data captured by said at least one radar sensor and (ii) lidar data captured by said at least one lidar sensor, said automatic emergency braking system of the equipped vehicle is controlled.

20. The vehicular collision mitigation system of claim 17, wherein said image processor processes image data captured by said forward viewing camera for a lane departure warning system of the equipped vehicle, and wherein said image processor processes image data captured by said rearward viewing camera for a surround view system of the equipped vehicle.

21. A vehicular collision mitigation system, said vehicular collision mitigation system comprising:

a plurality of cameras disposed at a vehicle equipped with said vehicular collision mitigation system, wherein said cameras have respective fields of view exterior of the equipped vehicle;

wherein at least one of said cameras comprises a forward viewing camera disposed behind a windshield of the equipped vehicle so as to view at least forwardly of the equipped vehicle through the windshield;

wherein said forward viewing camera comprises a photosensor array having rows and columns of photosensor elements and comprising at least 1 million photosensor elements;

wherein at least one of said cameras comprises a rearward viewing camera disposed at a rear portion of the equipped vehicle so as to view at least rearward of the equipped vehicle;

wherein said rearward viewing camera comprises a photosensor array having rows and columns of photosensor elements and comprising at least 1 million photosensor elements;

at least one radar sensor disposed at the equipped vehicle so as to sense at least forward of the equipped vehicle;

a control disposed at the equipped vehicle, said control comprising an image processor operable to process image data captured by said plurality of cameras;

said control operable to process radar data captured by said at least one radar sensor;

wherein, responsive at least in part to processing at said control of image data captured by said forward viewing camera and to processing at said control of radar data captured by said at least one radar sensor, an automatic emergency braking system of the equipped vehicle is controlled;

wherein, when the equipped vehicle is moving and responsive at least in part to a determination, via at least one selected from the group consisting of (i) image processing by said image processor of image data captured by said forward viewing camera and (ii) processing at said control of radar data captured by said at least one radar sensor, that the equipped vehicle is approaching an object present forwardly of the equipped vehicle, said control is operable to control application by said automatic emergency braking system of a vehicle brake of the equipped vehicle to mitigate collision with the object;

wherein the object present forwardly of the equipped vehicle comprises a vehicle;

wherein, responsive at least in part to image processing by said image processor of image data captured by said rearward viewing camera, said control determines that a following vehicle is following the equipped vehicle and that the determined following vehicle is within a threshold distance from the equipped vehicle and is approaching the equipped vehicle above a threshold rate of approach; and wherein, in order to mitigate collision by the equipped vehicle with the object determined present forwardly of the equipped vehicle and in order to mitigate collision by the determined following vehicle with the equipped vehicle, said control determines a degree of braking of the equipped vehicle responsive to a comparison of (i) rate of approach and distance of the equipped vehicle to the object determined present forwardly of the equipped vehicle and (ii) rate of approach and distance of the determined following vehicle to the equipped vehicle.

22. The vehicular collision mitigation system of claim 21, wherein said image processor processes image data captured by said rearward viewing camera for a rear backup system of the equipped vehicle.

23. The vehicular collision mitigation system of claim 21, wherein said image processor processes image data captured by said forward viewing camera for a headlamp control system of the equipped vehicle.

24. The vehicular collision mitigation system of claim 21, wherein at least one lidar sensor is disposed at the equipped vehicle so as to sense at least forward of the equipped vehicle, and wherein said control is operable to process lidar data captured by said at least one lidar sensor, and wherein responsive at least in part to processing at said control of image data captured by said forward viewing camera and to processing at said control of at least one selected from the group consisting of (i) radar data captured by said at least one radar sensor and (ii) lidar data captured by said at least one lidar sensor, said automatic emergency braking system of the equipped vehicle is controlled.

25. The vehicular collision mitigation system of claim 21, wherein said image processor processes image data captured by said forward viewing camera for a lane departure warning system of the equipped vehicle, and wherein said image processor processes image data captured by said rearward viewing camera for a surround view system of the equipped vehicle.

26. The vehicular collision mitigation system of claim 21, wherein, when the equipped vehicle is moving and responsive at least in part to determination that the moving equipped vehicle is approaching the object determined present forwardly of the equipped vehicle and when the determined following vehicle is beyond a threshold distance from the equipped vehicle and is approaching the equipped vehicle below a threshold rate of approach, said control controls application of the vehicle brake by said automatic emergency braking system of the equipped vehicle at a first degree of braking.

27. The vehicular collision mitigation system of claim 26, wherein, when the equipped vehicle is moving and responsive at least in part to determination that the moving equipped vehicle is approaching the object determined present forwardly of the equipped vehicle and responsive at least in part to determination of the determined following vehicle being within a threshold distance from the equipped vehicle and approaching the equipped vehicle above a threshold rate of approach, said control controls application of the vehicle brake by said automatic emergency braking system of the equipped vehicle at a second degree of braking, and wherein the second degree of braking is less than the first degree of braking.

28. The vehicular collision mitigation system of claim 27, wherein said control determines the second degree of braking based on at least one selected from the group consisting of (i) distance of the determined following vehicle from the equipped vehicle and (ii) rate of approach of the determined following vehicle to the equipped vehicle.

* * * * *